United States Patent
Denner et al.

(10) Patent No.: US 7,472,768 B2
(45) Date of Patent: Jan. 6, 2009

(54) DRIVE SYSTEM, ESPECIALLY FOR A MOTOR VEHICLE

(75) Inventors: Armin Denner, Werneck (DE); Knut Welke, Sulzheim (DE); Klaus Steinel, Bergrheinfeld (DE); Joachim Lindner, Dittelbrunn (DE); Frank Hirschmann, Niederwerrn (DE)

(73) Assignee: ZF Sachs AG, Schweinfurt (DE)

( * ) Notice: Subject to any disclaimer, the term of this patent is extended or adjusted under 35 U.S.C. 154(b) by 36 days.

(21) Appl. No.: 11/606,188

(22) Filed: Nov. 29, 2006

(65) Prior Publication Data

US 2007/0069696 A1    Mar. 29, 2007

Related U.S. Application Data

(62) Division of application No. 10/678,334, filed on Oct. 3, 2003, now abandoned.

(30) Foreign Application Priority Data

Oct. 4, 2002    (DE) ................ 102 46 227

(51) Int. Cl.
    *B60K 1/00*    (2006.01)
(52) U.S. Cl. ................ 180/65.1; 180/65.5; 310/74
(58) Field of Classification Search ........... 180/339, 180/383, 248, 65.2, 65.1, 65.5; 310/74, 45, 310/78; 290/40 C, 40 A; 192/48.8, 70.252
    See application file for complete search history.

(56) References Cited

U.S. PATENT DOCUMENTS

| | | | | |
|---|---|---|---|---|
| 4,341,282 A | * | 7/1982 | Bird ............................ | 180/339 |
| 4,346,773 A | | 8/1982 | Hofbauer et al. | |
| 4,364,773 A | * | 12/1982 | Veronneau et al. ..... | 106/284.02 |
| 4,458,156 A | | 7/1984 | Maucher et al. | |
| 4,894,570 A | * | 1/1990 | Kaneyuki ................... | 310/113 |
| 4,955,944 A | | 9/1990 | Aso et al. | |
| 4,958,095 A | | 9/1990 | Uchida et al. | |
| 5,462,496 A | * | 10/1995 | Dick et al. ................... | 475/204 |
| 5,755,302 A | | 5/1998 | Lutz et al. | |
| 6,311,495 B1 | | 11/2001 | Shimizu et al. | |
| 6,364,042 B1 | | 4/2002 | Joachim | |
| 6,376,927 B1 | * | 4/2002 | Tamai et al. ............... | 290/40 C |
| 6,388,348 B2 | * | 5/2002 | van Heyden et al. .......... | 310/74 |
| 6,437,467 B1 | * | 8/2002 | Schierling et al. .......... | 180/65.2 |
| 6,457,314 B1 | * | 10/2002 | Shimizu et al. ............... | 60/718 |
| 6,464,028 B1 | * | 10/2002 | Imani ......................... | 180/65.2 |
| 6,531,795 B2 | * | 3/2003 | Weimer ........................ | 310/58 |
| 6,561,336 B1 | * | 5/2003 | Huart et al. ............. | 192/70.252 |
| 6,586,852 B2 | * | 7/2003 | Geiger et al. .................. | 310/51 |
| 6,726,569 B1 | * | 4/2004 | Seidl et al. .................. | 464/68.1 |
| 6,830,139 B2 | * | 12/2004 | Carlson et al. ............. | 192/48.8 |
| 2002/0121817 A1 | * | 9/2002 | Weimer ........................ | 310/54 |

FOREIGN PATENT DOCUMENTS

| | | |
|---|---|---|
| DE | 199 27 261 | 12/2000 |
| DE | 100 25 853 | 4/2001 |
| DE | 102 45 855 | 4/2003 |
| FR | 2 791 008 | 9/2000 |

OTHER PUBLICATIONS

Examination Search Report issued for the corresponding Japanese Patent Application No. 2003-337475.

(Continued)

*Primary Examiner*—Hau V Phan
(74) *Attorney, Agent, or Firm*—Cohen Pontani Lieberman & Pavane LLP

(57) ABSTRACT

A drive system which has a drive unit with a drive shaft; a centrifugal mass arrangement, which is mounted on the drive shaft; and an electrical machine, comprising a stator arrangement and a rotor arrangement, where the rotor arrangement is mounted on the centrifugal mass arrangement, and where the stator arrangement and the rotor arrangement are adjacent to each other in the radial direction. So that optimum use can be made of the space available inside the drive unit, and so that the overall length of the drive unit required in the axial direction relative to the axis of rotation (A) can be kept as short as possible, the centrifugal mass arrangement has a contour such that, relative to the axis of rotation (A), a receiving space (71) is formed radially inside the electrical machine. The receiving space is bounded on at least one side by the centrifugal mass arrangement, and at least one additional component of the drive unit is installed in the receiving space.

7 Claims, 4 Drawing Sheets

OTHER PUBLICATIONS

Examination Search Report issued for the corresponding German Patent Application No. DE 102 46 227.5.

Search Report Feb. 8, 2007 issued for the corresponding French Application No. 0311597.

* cited by examiner

DRIVE SYSTEM, ESPECIALLY FOR A MOTOR VEHICLE

CROSS-REFERENCE TO RELATED APPLICATIONS

This is a division of application Ser. No. 10/678,334 filed on Oct. 3, 2003 now abandoned which claims priority of German Application No. 102 46 227.5 filed on Oct. 4, 2002.

BACKGROUND OF THE INVENTION

1. Field of the Invention

The present invention pertains to a drive system, especially for a motor vehicle, having a centrifugal mass mounted on a drive shaft and an electrical machine with a rotor mounted on the centrifugal mass and a stator arranged radially with respect to the rotor.

2. Description of the Related Art

Drive systems of this type can be designed in many different ways and usually have, first, a prime mover. A prime mover of the type in question can be, for example, a combustion machine such as an internal combustion engine or the like. Drive systems of the known type also usually have a drive unit, which can be built up in turn out of various components. For example, the drive unit can have a drive shaft, by means of which the torque produced by the prime mover can be transmitted to other components. The drive unit can also include a centrifugal mass arrangement, which is mounted on the drive shaft. The drive unit can also have an electrical machine.

In general, these electrical machines can be rotating machines, for example, which use a magnetic field to convert electrical energy into mechanical energy according to the motor principle or mechanical energy into electrical energy according to the generator principle.

These types of electrical machines, which can be designed either as synchronous machines or as asynchronous machines, usually have a first machine component and a second machine component. The two machine components rotate relative to each other or can be rotated relative to each other. The two machine components are mounted adjacent to each other in the radial direction. One of the two machine components is usually mounted radially inside the other machine component with respect to the axis of rotation of the electrical machine. Depending on the design of the electrical machine, one of the machine components can be a rotor arrangement and the other machine component can be a stator arrangement. The stator arrangement, also called simply the stator, is usually the stationary part, whereas the rotor arrangement, also called simply the rotor, is the rotating part.

Depending on the design of the electrical machine, the stator component consists, for example, of a sheet packet, which forms a yoke and a number of teeth. The electrical windings are laid in the grooves between the teeth. The magnetic field of the electrical machine is produced when current passes through these windings. The rotor arrangement consists, for example, of a sheet packet, on which a number of magnets, possibly permanent magnets, are mounted.

One of the areas in which electrical machines are used is that of vehicles of all types. In vehicles, electrical machines are used in their function as generators. When these electrical machines thus operate according to the generator principle, they produce electrical energy, which can then be made available to other consumers. In another application in vehicles, electrical machines are used as starter-generators, for example. A starter-generator is an electrical machine which is mounted between the drive shaft of a prime mover, such as the crankshaft of an internal combustion engine, and a component of the drive unit, possibly a clutch, a gearbox, or the like, in the drive system of the vehicle. The starter-generator can be used, first, to start the prime mover. Once the vehicle is in operation, it can also operate as a generator and can therefore replace both the starter and the generator in the vehicle.

In addition to the components already described above, the drive unit can also include other components, which can include, for example, a clutch, a gearbox, a torque converter, etc.

A drive system of this type is described in, for example, DE 199 27 261. These types of drive systems are used to advantage in motor vehicles. Especially in the vehicle sector, however, the need to reduce the amount of space required for the drive system is increasing. This can be explained by advances in engineering, which make it necessary to accommodate ever-increasing numbers of components in the engine compartment of the vehicle. The solution disclosed in the publication cited above already offers a way to reduce the space required to accommodate the drive system.

SUMMARY OF THE INVENTION

Proceeding from the state of the art cited above, the object of the present invention is to improve the drive system of the type described above so that the available space is utilized to the best possible degree and so that the axial length of the drive system can be kept as short as possible. In addition, an especially advantageous use of drive system of this type is to be presented.

The present invention is based on the insight that additional space, which can be used to accommodate components of the drive unit, can be created by designing the centrifugal mass arrangement in a special way.

According to the first aspect of the invention, the centrifugal mass arrangement has a contour such that a receiving space is formed radially inside the electrical machine; the receiving space is bounded on at least one side by the centrifugal mass arrangement; and at least one additional component of the drive unit is accommodated in the receiving space.

As a result of the drive system according to the invention, an additional receiving space is created, in which additional components of the drive unit can be accommodated. According to the invention, the additional receiving space is formed in the area of the electrical machine. Giving the centrifugal mass arrangement a special contour creates the additional receiving space.

The electrical machine has, first, a stator arrangement and a rotor arrangement, which rotate relative to each other or which can be rotated relative to each other. Depending on the design of the electrical machine, either the rotor arrangement or the stator arrangement can be mounted radially inside the other arrangement with respect to the axis of rotation of the electrical machine. When the electrical machine is of the external rotor type, the stator arrangement is mounted radially inside the rotor. In the case of an electrical machine of the internal rotor type, the rotor will be radially inside the stator. The present invention is not limited to one specific type of electrical machine. Electrical machines of the external rotor type and those of the internal rotor type can both offer advantages. Synchronous machines, especially synchronous machines excited by permanent magnets, and asynchronous machines can be cited as examples of suitable electrical machines.

The centrifugal mass arrangement according to the invention has a contour such that a receiving space is formed radially inside the electrical machine, that is, radially inside the rotor arrangement or radially inside the stator arrangement. "Radially inside" is to be interpreted again in relationship to the axis of rotation of the electrical machine. When the electrical machine is installed in a drive system of the type described above, it is advantageous for the axis of rotation of the electrical machine to be the same as the axis of rotation of the drive shaft and the same as the axis of rotation of other power takeoff shafts downline from the drive shaft.

Additional components of the drive unit can be accommodated in the receiving space formed by the special design of the centrifugal mass arrangement. Thus optimum use is made of the space available. At the same time, the overall axial length of the drive unit and thus of the overall drive system is further reduced. The axial orientation is again based on the axis of rotation of the electrical machine or on the previously mentioned axis of rotation of the drive unit.

Thus the invention is not limited to specific types of components or to specific numbers of components, which can be mounted in the receiving space. The type and number of components depend on the size, type, and area of application of the electrical machine and of the drive unit or drive system. A few nonexclusive examples of components, which can be installed advantageously in the receiving space, will be described in greater detail below in the further course of the specification.

According to the invention, the rotor arrangement is mounted on the centrifugal mass arrangement. This has the effect of reducing the required space, but it also has the effect of increasing the mass moment of inertia of the centrifugal mass arrangement.

So that axial misalignments which could occur as a result of, for example, the powerful forces of the permanent magnets in the rotor arrangement can be prevented, it is advantageous for the stator and the rotor to be connected to each other by suitable fastening means such as screws, bolts, or the like until after they have been mounted in the drive unit.

It is advantageous for the drive system to have a prime mover in which the electrical machine is installed axially between the prime mover and the centrifugal mass arrangement. "Axially" is to be interpreted here again in relationship to the axis of rotation of the electrical machine or to the axis of rotation of the drive unit or of the drive system. As already explained above, it is advantageous for these axes of rotation to be the same. In this type of design, the electrical machine is mounted on the side of the prime mover that faces the flywheel arrangement. As a result, a drive unit with an especially compact design can be achieved, and thus the design of the entire drive system becomes especially compact.

The invention is not limited to a specific type of prime mover. The prime mover can consist, for example, of a combustion machine such as an internal combustion engine or the like.

It can be advantageous to install the drive unit in a one-part or multi-part housing. If a multi-part housing is used, a spacer element such as a spacer ring or the like can be provided between the individual parts of the housing. A spacer element of this type makes it possible to compensate easily for any discrepancies in length that may be present. Thus the individual parts of the housing can be produced with a predetermined geometric contour, but it will still be possible to install the housing parts in different drive systems. Any length discrepancies that may be present can be easily and inexpensively corrected by the use of spacer elements of suitable size.

It is conceivable, for example, that the spacer element could be designed as an independent structural component. It is also conceivable that the spacer element could be an integral part of one of the housing parts.

It can be advantageous to attach the stator arrangement to the housing by the use of a stator bracket. The housing can be, for example, the bell of the centrifugal mass arrangement. It is also possible, of course, for the stator bracket to be attached directly to the prime mover.

In a further elaboration, it is possible for the stator bracket to have a cooling device. This cooling device can be used effectively to cool the individual components of the electrical machine, especially the stator arrangement. As will be explained in greater detail in the further course of the specification, the cooling device can also be used, if desired, to cool additional components or parts of additional components which are mounted in the receiving space according to the invention.

If care is taken to mount the stator bracket appropriately on the housing of the drive unit or directly on the prime mover, it is possible for the cooling device in the stator bracket to be connected to the cooling device of the prime mover, so that the stator bracket can be cooled by the cooling device of the prime mover. In the case of an internal combustion engine, this means that the bracket would be cooled by the engine cooling water or by motor oil.

It can be advantageous for the stator bracket to form one of the boundaries of the receiving space.

In a further elaboration, the centrifugal mass arrangement can have two areas, which are arranged radially with respect to each other. "Radial" is based here on the axis of rotation of the centrifugal mass arrangement, which is advantageously the same as the axis of rotation of the drive shaft on which the centrifugal mass arrangement is mounted. One of the two areas is thus farther inward in the radial direction with respect to the axis of rotation than the other area.

It is also advantageous for the two areas mentioned to be offset from each other in the axial direction. "Axial" here again is based on the axis of rotation of the centrifugal mass arrangement. The centrifugal mass arrangement thus acquires a step-like design.

To achieve this, the two areas are connected to each other by a third connecting area.

It can advantageous for the centrifugal mass arrangement to be made in the form of a "pot", which extends around the electrical machine. This pot is formed in particular by the connecting area and by the area of the centrifugal mass arrangement that is situated radially farther outward with respect to the axis of rotation. In this way, the components of the electrical machine are also well protected at the same time. It can be advantageous for the radially outer area and the connecting area to form two sides of a protected space of this type. A third side of the protected space can be formed by, for example, the housing wall. Depending on the design of the housing of the drive unit, the fourth wall of the protected space can be formed either also by a wall of the housing or by a wall of the prime mover.

As a further elaboration, the radially inner area of the flywheel arrangement and the connecting area can form two sides of the receiving space.

In a different embodiment, the centrifugal mass arrangement can have two areas which are connected to each other and which are oriented at an angle to each other. In this way, the centrifugal mass arrangement can be produced in an especially simple and low-cost manner. It can be provided that the flywheel arrangement is produced as a single piece. It is also conceivable that the individual areas of the flywheel arrangement are first produced separately and then connected to each other.

It is advantageous in this case for the two areas of the flywheel arrangement to be oriented at an angle to each other. The invention is not limited to specific angles, however. For example, the two areas can be oriented at an angle of 90° to each other. In this case, the centrifugal mass arrangement has an approximately L-shaped contour. Other angles and thus also other contours of the centrifugal mass arrangement are also possible, of course, so that the invention is not limited to the examples cited.

It can be advantageous for a first area of the centrifugal mass arrangement to be designed as an attachment area for the attachment of the centrifugal mass arrangement to the drive shaft. A second area of the centrifugal mass arrangement can then be designed as a receiving area for the rotor arrangement. In certain special cases, furthermore, it can advantageous for this second area of the centrifugal mass arrangement to have at least one through-opening. Such through-openings are especially helpful when components, which must extend at least partially out of the receiving space, are mounted in the receiving space. Several nonexclusive examples of this will be explained in greater detail in the further course of this specification.

It can be advantageous for the two areas of the centrifugal mass arrangement to form two sides of the receiving space.

As already presented in the introduction to the specification, the drive unit can comprise many different components and assemblies. These can include, for example, a gearbox, a torque converter, etc. The drive unit can preferably also have a clutch. In this case, it is preferable for at least one component of the clutch to be accommodated in the receiving space.

The invention is not limited to specific types of clutches. For example, the clutch can be a friction clutch or some other type of clutch.

If the drive system has a prime mover and a drive unit connected to it, at least one component of the clutch in an embodiment of this type will therefore be situated in front of the centrifugal mass arrangement on the side facing the prime mover.

It is possible, for example, for at least one component of a clutch disk arrangement of the clutch to be accommodated in the receiving space.

It is also conceivable that at least one component of an actuating device of the clutch could be accommodated in the receiving space. The actuating device of the clutch can be designed in any desired way. For example, the actuating device can be a hydraulic slave cylinder, a pneumatic actuator, or the like. Because of the special design of the drive unit, it is advantageous for the actuating device to have a concentric design. "Concentric" is based here on the axis of rotation of the centrifugal mass arrangement or on the axis of rotation of the electrical machine.

If the actuating device of the clutch has an actuator, at least some of the components of the actuator can be advantageously accommodated in the receiving space formed by the centrifugal mass arrangement.

For example, the actuator can be designed so that it has a cylinder. It can be advantageous in this case for the cylinder to be formed by the inside surface of the stator bracket described above. In this way, the stator bracket forms not only the appropriate areas of the centrifugal mass arrangement but also one of the other sides of the receiving space. A design of this type offers the advantage that the conventional cylinder normally required for the actuator can be eliminated. This leads, first, to cost savings in the production of the actuator.

The design also leads to a further reduction in the amount of space required. Finally, the design makes it possible to cool the actuator in a very simple manner, because the actuator can be cooled by the same system that cools the stator bracket.

It can be advantageous for the clutch to have a diaphragm spring. At least part of this diaphragm spring can be accommodated in the receiving space.

Because one or more parts of the clutch can be installed in the receiving space, the overall axial length of the drive unit and thus of the drive system becomes very short.

In another embodiment, at least one torsion damper can be accommodated in the receiving space. It is especially advantageous to use the receiving space to hold a double arrangement or a multiple arrangement of torsion dampers. All the torsion dampers can, for example, be connected by a set of external teeth to a large, internally toothed sleeve or hub, which carries in turn a common cover ring. The creation of a receiving space according to the invention now makes it easy to install two or more torsion dampers without increasing the amount of space required. This also leads to an especially good isolation of the vibrations.

The centrifugal mass arrangement can be designed in many different ways within the scope of the invention. The centrifugal mass arrangement can be, for example, the flywheel of a clutch, possibly of a friction clutch. In another embodiment, the centrifugal mass arrangement can be, for example, a torque converter, preferably its housing.

It is especially advantageous for the electrical machine to be designed as a starter-generator. A starter-generator of the type in question will be used increasingly in the future as a replacement for the current combination of separate components, namely, a starter and a generator. In comparison with past solutions, a starter-generator offers better efficiency, lower weight, and greater electrical power. In the future, energy consumers, which are driven mechanically today, will be driven by electricity instead. A starter-generator can be used not only to start and to stop a prime mover, such as an internal combustion engine, but also to take over various other functions during the operation of the engine such as braking functions, booster functions, battery management, active vibration damping, synchronization of the prime mover, etc.

As described above, the starter-generator can be mounted advantageously in the same area as that occupied by the centrifugal mass arrangement, such as a flywheel, or it can be integrated into this arrangement; the starter-generator will therefore be safely protected in a housing. If, from the perspective of the prime mover, a clutch is located behind the centrifugal mass arrangement, the starter-generator will also be inside the clutch bell, which usually surrounds a clutch. As a result of the special design of the centrifugal mass arrangement, i.e. the creation of an additional receiving space, an especially favorable, compact arrangement of the individual components is found in this area of the drive unit, which comprises, for example, a pressure plate arrangement of a clutch, a clutch disk arrangement, a clutch actuating device, and possibly an intermediate flywheel. Optimum use is made of the space available to house these components, and the overall axial length of the drive unit can be kept as short as possible.

According to a second aspect of the invention, a drive system according to the invention as described above can be used to particular advantage in a commercial vehicle (truck).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
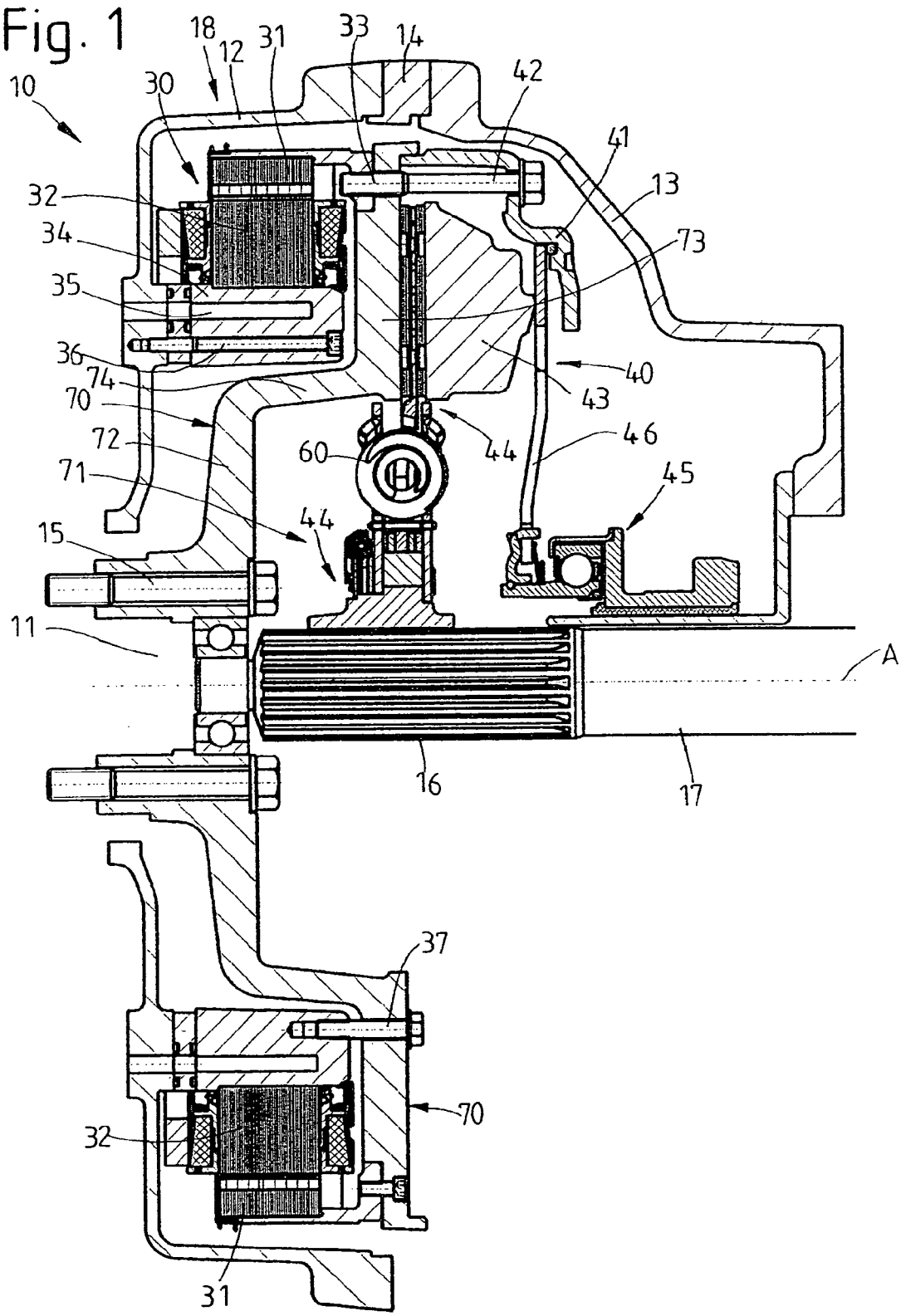
FIG. 1 shows a longitudinal cross section through a first embodiment of the drive system according to the invention.

FIG. 1 shows a drive system 10, which is designed in particular for use in a motor vehicle, preferably in a commercial vehicle. The drive system 10 has a drive unit 18, which has a drive shaft 11. By way of the drive shaft 11, which rotates around an axis of rotation A, the drive unit 18 is connected to a prime mover (not shown). The prime mover can be, for example, a combustion machine such as an internal combustion engine or the like. The torque produced in the prime mover is transmitted via the drive shaft 11, which can be, for example, a crankshaft, to the adjacent assemblies of the drive unit 18.

The drive shaft 11 is also connected to a centrifugal mass arrangement 70. The centrifugal mass arrangement 70 in the present example is the flywheel of a clutch 40, which, in the present example, is designed as a friction clutch.

The individual assemblies of the drive unit 18 are mounted in a housing, which, in the present example, consists of several housing parts. A first housing part 12 is a flywheel bell. Another, second housing part 13 can be designed as a gearbox bell, for example, or the like. Between the two housing parts 12, 13, a spacer element 14 in the form of a spacer ring is provided, which can be used during the installation of the drive unit 18 in a drive system 10 to compensate for any length discrepancies which may be present.

An electrical machine 30 is mounted inside the flywheel bell 12 between the prime mover (not shown) and the flywheel 70. This machine functions as a starter-generator. The electrical machine 30 has a rotor arrangement 31 and a stator arrangement 32. The electrical machine 30 is of the external rotor type, which means that the rotor arrangement 31 is located farther outward in the radial direction with respect to the axis of rotation A than the stator arrangement 32.

The rotor arrangement 31 is connected to the centrifugal mass arrangement 70 by a suitable rotor fastening means 33 such as screws or bolts. In this way, the mass moment of inertia of the centrifugal mass arrangement 70 is also increased. Radially inside of the rotor arrangement 31, the stator arrangement 32 is installed, which is connected to the first housing part 12 by a stator bracket 34. The connection can be accomplished, for example, by means of suitable stator fastening means 36 such as screws or bolts. In the stator arrangement 34, furthermore, a cooling device 35 is provided, which is connected for example, to a cooling system of the prime mover (not shown). In this way, the stator bracket 34 and thus also the stator arrangement 32 can be cooled in a very simple and effective manner.

The clutch 40 in the present case is designed as a friction clutch and is located inside a clutch housing 41, that is also referred to as "clutch bell". The clutch housing 41 is connected to the centrifugal mass arrangement 70 by appropriate fastening means 42 such bolts or screws.

The clutch 40 also has a clutch pressure plate 43; in the present exemplary embodiment, the opposing pressure plate is formed by the centrifugal mass arrangement 70.

An actuating device 45 actuates the clutch pressure plate 43. For this purpose, the clutch pressure plate 43 is connected by a diaphragm spring 46 to the actuating device 45 in the manner known in and of itself.

A clutch disk arrangement 44 is provided between the clutch pressure plate 43 and an area of the centrifugal mass arrangement opposite the pressure plate 43. A torsion damper 60 is also provided in the clutch disk arrangement 44. The clutch disk arrangement 44 is connected to the hub 16 of a power takeoff shaft 17. When the clutch 40 is closed, the torque provided by the drive shaft 11 can be transmitted in the manner known in and of itself via the clutch disk arrangement 44 to the power takeoff shaft 17.

To prevent axial misalignments of the stator arrangement 32 and the rotor arrangement 31 until after they have been installed, these components can be held in place initially by appropriate fastening means. For example, screws or bolts could connect the stator arrangement 32 and the rotor arrangement 31 to each other until they are installed. Assembly fastening means 37 such as bolts or screws can also connect the stator arrangement 32 to the centrifugal mass arrangement 70. It is advantageous to remove the fastening means as soon as the electrical machine 30 has been installed in the drive system and adjusted.

So that the space required for the drive unit 18 and thus for the entire drive system 10 can be kept as small as possible, it is necessary to create as much room as possible to accommodate the individual components of the drive unit 18, i.e., of the individual assemblies of the drive unit 18. In the present exemplary embodiment, designing the centrifugal mass arrangement 70 in a special way creates additional room.

The centrifugal mass arrangement 70 according to FIG. 1 consists, in all, of three areas, i.e., a first area 72, a second area 73, and a third area 74, which connects the other two areas 72 and 73. The design of the centrifugal mass arrangement 70 is selected so that the first area 72 serves initially as the attachment area. The centrifugal mass arrangement 70 is thus connected to the drive shaft 11 by this attachment area 72. This can be accomplished by means of suitable fastening means 15 such as bolts or screws. Radially outside the attachment area 72 with respect to the axis of rotation there is the second area 73 of the centrifugal mass arrangement 70, which, in the present case, serves as the receiving area for the rotor arrangement 31. This receiving area 73 also serves as the opposing pressure plate for the pressure plate 43 of the clutch.

The two areas 72 and 73 are also offset from each other in the axial. direction. The axial offset is again to be understood with reference to the axis of rotation A. In this way, the centrifugal mass arrangement 70 has a step-like contour, the height of the step being determined by the length of the connecting area 74.

Through the cooperation between the connecting area 74 and the second area 73, the centrifugal mass arrangement 70 designed in this way forms a kind of pot, which surrounds the electrical machine 30. The connecting area 74 and the second area 73 form two sides of a protected space for the electrical machine 30. The third and fourth sides of this protected space are formed in the present example by two sides of the housing part 12. The electrical machine is thus reliably protected from damage and dirt in the drive unit 18.

As a result of the special design of the centrifugal mass arrangement 70, furthermore, a receiving space 71 is created, in which additional components of the drive unit 18 can be accommodated. In the present example, the receiving space 71 is bounded on two sides by the centrifugal mass arrangement 70, namely, by the first area 72 and by the connecting area 74. With respect to the axis of rotation A, the receiving space 71 is located radially inside the electrical machine 30; and in the exemplary embodiment according to FIG. 1, at least one component of the clutch 40, among other things, is accommodated in this space. In the present example, parts of the clutch disk arrangement 44 and the torsion damper 60 are located in the receiving space 71.

As a result of the special design of the centrifugal mass arrangement 70, another space for holding components is created radially inside the electrical machine 30, so that optimum use can be made of the available space and the overall axial length (based on the axis of rotation A) of the drive unit 18 and thus of the overall drive system 10 can be kept as short as possible.

Figure 2:
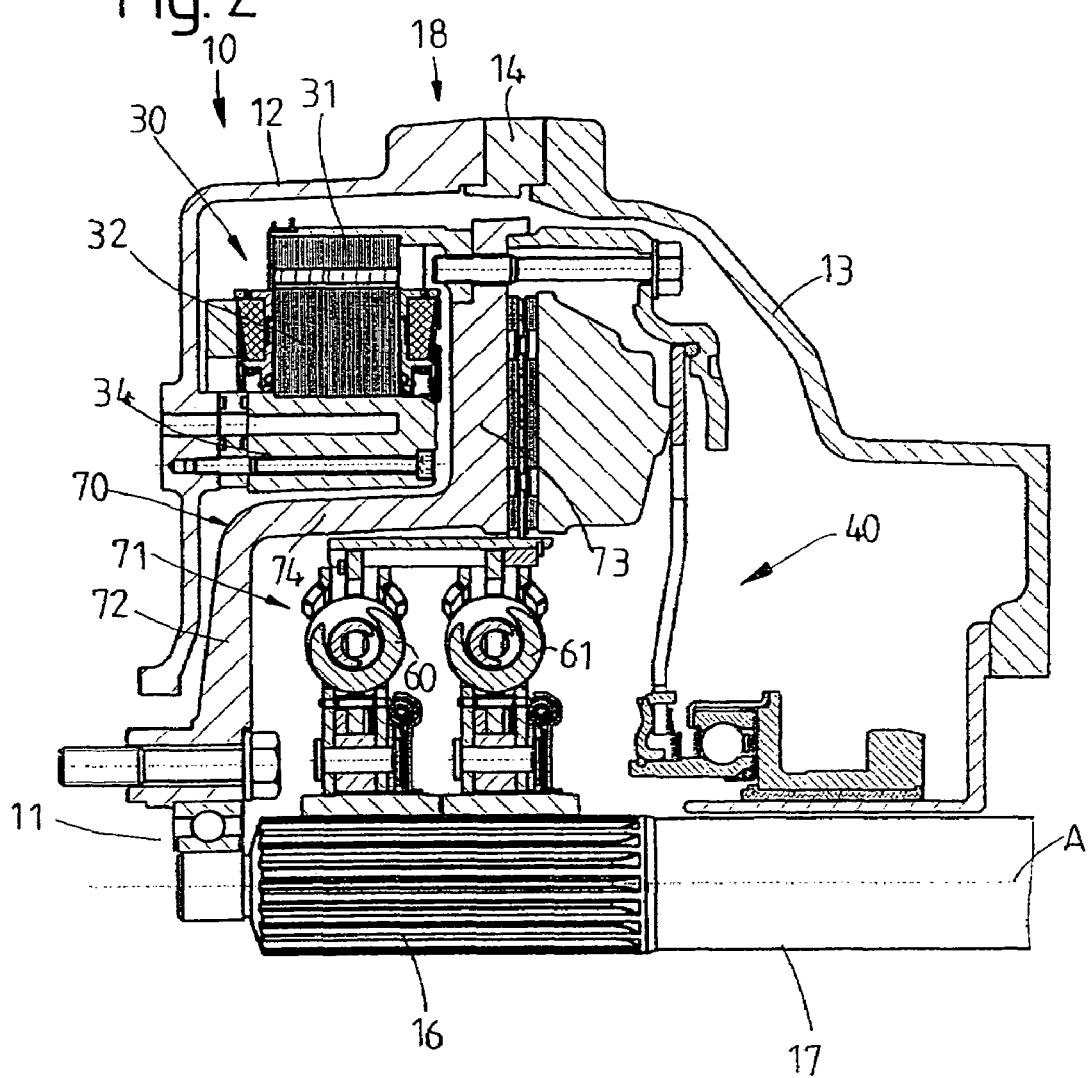
FIG. 2 shows a longitudinal cross section through a second embodiment of the drive system according to the invention

FIG. 2 shows a drive unit 18 of a drive system 10, which is similar in its basic design to the drive unit 18 of FIG. 1. With respect to the structure and the function of the drive unit 18, reference can therefore be made initially to the explanations offered in association with FIG. 1. The same components have been provided with the same reference numbers.

The drive unit 18 according to FIG. 2 has a receiving space 71 which is bounded on two sides by the first area 72 and the connecting area 74 of the centrifugal mass arrangement 70; with respect to the axis of rotation A and the electrical machine 30, this space is situated radially inside the machine, and a double arrangement of torsion dampers 60, 61 is provided in it. Of course, it is also conceivable that more than two torsion dampers could be provided in the receiving space 71. All torsion dampers 60, 61 are connected to the hub 16. For example, the torsion dampers 60, 61 can be connected by a set of external teeth to a large, internally toothed sleeve, which carries a common cover ring.

The installation of two or more torsion dampers 60, 61 makes it possible to provide especially good isolation of the vibrations.

Figure 3:
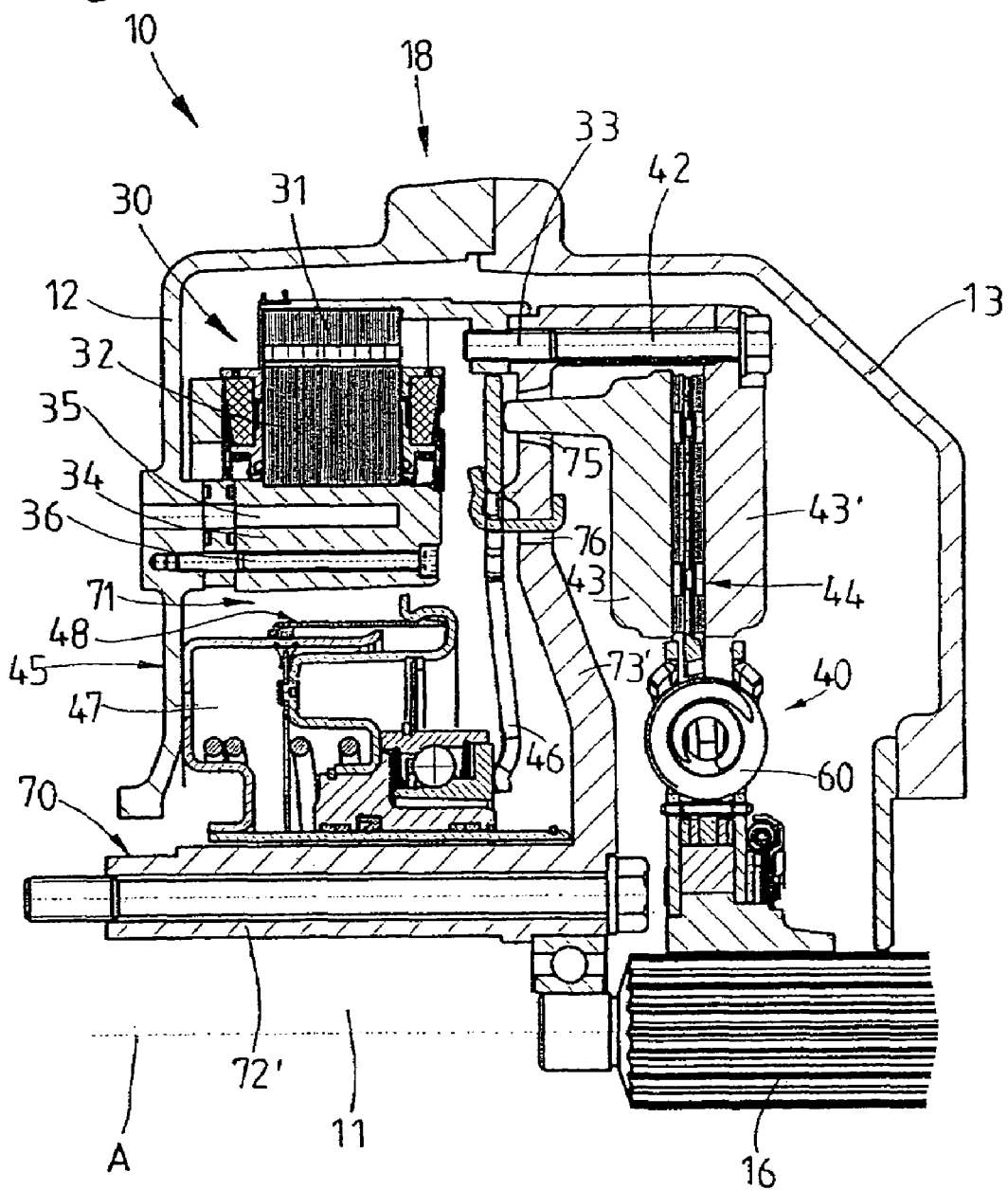
FIG. 3 shows a longitudinal cross section through a third embodiment of the drive system according to the invention.
Figure 4:
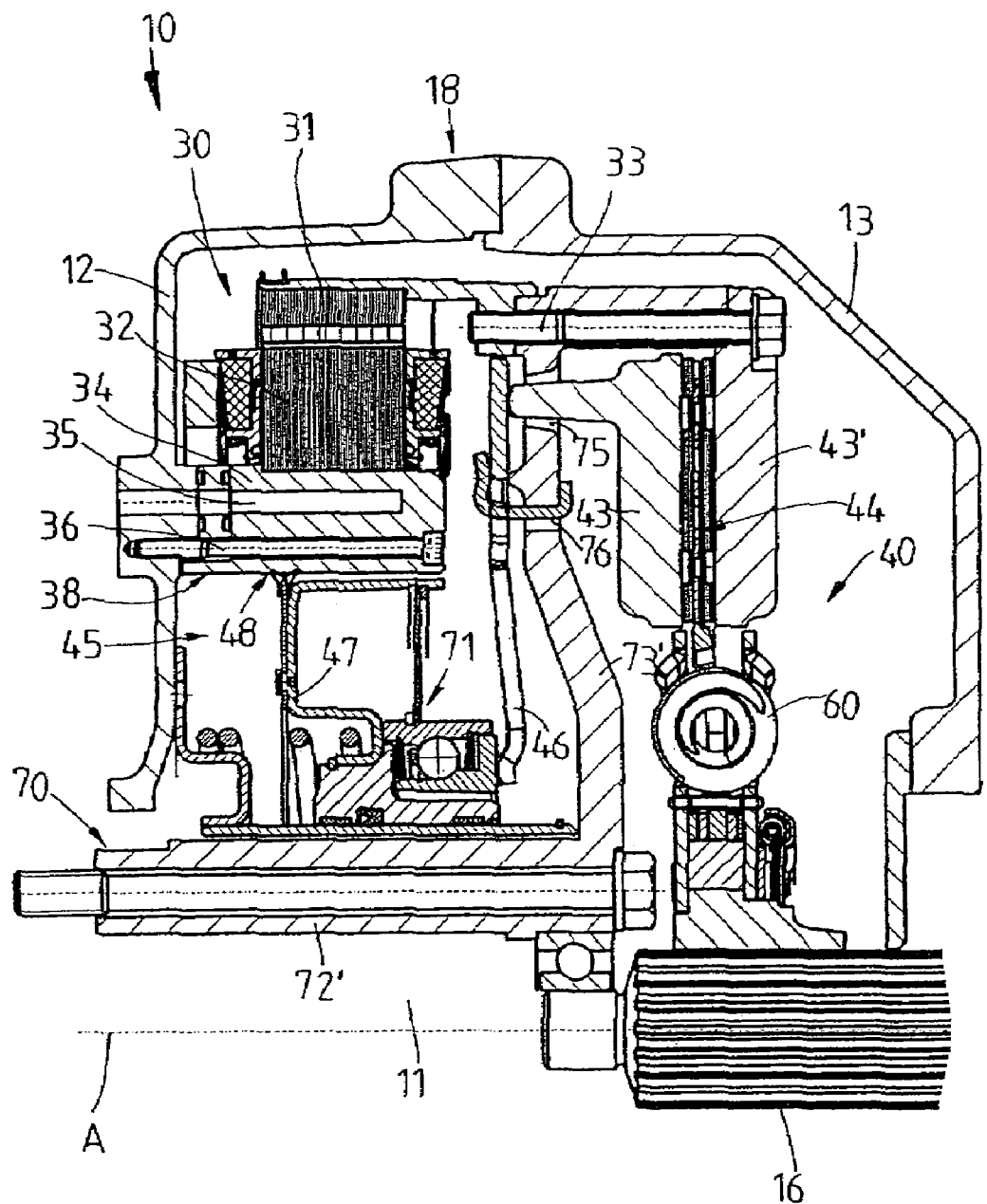
FIG. 4 shows a longitudinal cross section through a fourth embodiment of the drive system according to the invention.

FIGS. 3 and 4 show exemplary embodiments of a drive unit 18 for a drive system 10 which have the same assemblies as in the embodiments according to FIGS. 1 and 2, but in which the assemblies have been designed and installed differently.

The drive unit 18 again has a multi-part housing, which, as in FIGS. 1 and 2, can consist of a first housing part 12 and a second housing part 13. In contrast to the examples according to FIGS. 1 and 2, a separate spacer element is not provided in the exemplary embodiments according to FIGS. 3 and 4. As an alternative, it would also be possible for the spacer element to be permanently integrated into one of the two housing parts 12 or 13.

The drive unit 18 also has a centrifugal mass arrangement 70, except that here its contour differs from that shown in FIGS. 1 and 2. According to FIGS. 3 and 4, the centrifugal mass arrangement 70 consists of two areas 72', 73', which are connected to each other and which are oriented at an angle to each other. In the present exemplary embodiment, the centrifugal mass arrangement 70 is designed as a single piece. It is also conceivable, however, that the two areas 72', 73' of the centrifugal mass arrangement 70 could be produced separately first and then joined to each other to form the flywheel. This centrifugal mass arrangement 70 is connected via the first area 72' to the drive shaft 11, which can be accomplished again by means of appropriate screws or bolts or the like. The drive shaft 11 rotates around an axis of rotation A, as also in FIGS. 1 and 2.

The second area 73' of the centrifugal mass arrangement 70 projects from the first area 72' at a certain angle. In the examples according to FIGS. 3 and 4, this angle is approximately 90°, so that the centrifugal mass arrangement 70 acquires the approximate shape of an "L".

As also in FIGS. 1 and 2, an electrical machine 30 in the exemplary embodiments according to FIGS. 3 and 4 is designed as a starter-generator and is installed between a prime mover (not shown) and the centrifugal mass arrangement 70. The electrical machine 30 is located inside the first housing part 12. The rotor arrangement 31 of the electrical machine 30 is attached to the centrifugal mass arrangement 70, i.e., to the second area 73' of the centrifugal mass arrangement 70, by suitable rotor fastening means 33. The second area 73' can thus be referred to as a "receiving area". In contrast, the first area 72' of the centrifugal mass arrangement 70 can be referred to as an "attachment area".

The stator arrangement 32 is attached by a stator bracket 34 to the first housing part 12. This can again be done by the use of suitable stator fastening means 36. Inside the stator bracket, a cooling device 35 is provided, by means of which at least the stator arrangement 32 can be cooled. The cooling device 35 can be connected to, for example, a cooling device of the prime mover (not shown).

As seen from the perspective of the electrical machine 30, a clutch 40 is provided behind the centrifugal mass arrangement 70. The clutch 40 has two clutch pressure plates 43, 43'; the clutch pressure plate 43' is connected to the second area 73' of the centrifugal mass arrangement 70 by suitable fastening means 33 such as screws or bolts.

The clutch 40 has a clutch disk arrangement 44, which is connected to the hub 16 of a power takeoff shaft. A torsion damper 60 is also integrated into the clutch disk arrangement 44.

As also in the exemplary embodiments according to FIGS. 1 and 2, the centrifugal mass arrangement 70 is also designed in the exemplary embodiments according to FIGS. 3 and 4 in such a way that it creates a receiving space 71 radially inside the electrical machine 30, this receiving space 71 being bounded on at least one side by the centrifugal mass arrangement 70. According to the examples of FIGS. 3 and 4, the receiving space 71 is bounded on two sides by the centrifugal mass arrangement 70 via the two areas 72', 73' of the centrifugal mass arrangement 70. A third side of the receiving space 71 is bounded by the stator bracket 34.

Certain components of the clutch 40 are installed inside the receiving space 71 and thus in front of the centrifugal mass arrangement 70. First, the actuating device 45 of the clutch is mounted in the receiving space 71. This actuating device 45 consists of an actuator 47 mounted in a cylinder 48. The actuator 47 actuates a diaphragm spring 46, at least part of which is also located in the receiving space 71. The diaphragm spring 46 is therefore situated in front of the centrifugal mass arrangement 70, on the side facing the prime mover. The actuator 47 can be, for example, a concentric pneumatic actuator.

Because of the way in which the drive unit 18 is designed, the size of the drive unit 18 can be made very small in the axial direction (relative to the axis of rotation A).

So that the clutch pressure plate 43 can be actuated properly, through-openings 75, 76 are provided in the second area 73' of the centrifugal mass arrangement 70, through which openings the diaphragm spring 46 can make contact with the clutch pressure plate 43. The actuating device 45 can thus perform its function properly via the diaphragm spring 46.

FIG. 4, finally, shows an embodiment of a drive unit 18 for a drive system 10, which is approximately the same as that according to FIG. 3. For this reason, reference can be made initially to the explanations of the basic design and function offered in regard to FIG. 3. The same components are again provided with the same reference numbers.

The embodiment according to FIG. 4 differs from the design variant shown in FIG. 3 in that the actuating device 45, comprising an actuator 47, no longer has its own independent cylinder 48. Instead, the cylinder 48 is formed by the surface 38 of the stator bracket 34 which is on the inside, as seen from the perspective of the axis of rotation A. The inside surface 38 of the stator bracket 34 thus serves simultaneously as the cylinder for the actuator 47, which can be, for example, a concentric, pneumatic actuator.

In comparison with the design variant shown in FIG. 3, the cylinder of the actuator 47 is eliminated in the embodiment according to FIG. 4. This leads among other things to a further reduction in the amount of space required. In addition, the actuator 47 can be easily cooled efficiently, because it can be cooled simultaneously by the cooling device 35 that cools the stator bracket 34.

The goal achieved by the present invention is that optimum use can be made of the space available inside the drive unit 18, so that the overall axial length of the drive unit 18 in relationship to the axis of rotation A can be kept as short as possible.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive system for a motor vehicle, said drive system comprising:
    a housing;
    a drive shaft;
    a centrifugal mass mounted on said drive shaft for rotation about an axis and profiled with an axial receiving space, said centrifugal mass being arranged in said housing;
    an electrical machine arranged in said housing and comprising a rotor mounted on the centrifugal mass and a stator arranged radially inside of said rotor;
    a clutch comprising a clutch disk and an actuating device, said actuating device being accommodated in said axial receiving space, said actuating device being radially inside of and at least partially axially aligned with said electrical machine; and
    a stator bracket fixing said stator to said housing, said stator bracket having an inner surface facing said axis, said actuating device comprising a cylinder formed by said inner surface.

2. The drive system of claim 1, wherein said stator bracket has a cooling channel.

3. The drive system of claim 1, wherein said centrifugal mass comprises an axially extending first area and a radially extending second area, said first area being attached to said drive shaft, said second area being attached to said rotor.

4. The drive system of claim 3, wherein said first and second areas bound two sides of said receiving space.

5. The drive system of claim 4, wherein said clutch disk is arranged outside of said receiving space, said second area lying axially between said actuating device and said clutch disk.

6. The drive system of claim 5, wherein said second area has at least one through opening by which said actuating device can communicate with said clutch disk.

7. The drive system of claim 4, wherein said inner surface defines a third side of said receiving space.

* * * * *